US012722616B2

(12) United States Patent
Usui et al.

(10) Patent No.: US 12,722,616 B2
(45) Date of Patent: Sep. 1, 2026

(54) ELECTRIC PARKING BRAKE DEVICE

(71) Applicants: Hitachi Astemo, Ltd., Ibaraki (JP); Hitachi Astemo Ueda, Ltd., Nagano (JP)

(72) Inventors: Koji Usui, Ibaraki (JP); Sandip Purane, Ibaraki (JP); Hiromu Narukawa, Ibaraki (JP); Takeshi Sakaguchi, Nagano (JP); Masato Uno, Nagano (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 1028 days.

(21) Appl. No.: 17/910,662

(22) PCT Filed: Dec. 18, 2020

(86) PCT No.: PCT/JP2020/047373
§ 371 (c)(1),
(2) Date: Sep. 9, 2022

(87) PCT Pub. No.: WO2021/181809
PCT Pub. Date: Sep. 16, 2021

(65) Prior Publication Data

US 2023/0150466 A1 May 18, 2023

(30) Foreign Application Priority Data

Mar. 12, 2020 (JP) ................................ 2020-043291

(51) Int. Cl.
*B60T 13/74* (2006.01)
*B60T 8/171* (2006.01)
(Continued)

(52) U.S. Cl.
CPC ............ *B60T 13/745* (2013.01); *B60T 8/171* (2013.01); *B60T 17/22* (2013.01); *B60T 11/046* (2013.01);
(Continued)

(58) Field of Classification Search
CPC .... B60T 13/745; B60T 13/746; B60T 11/046; F16D 2121/24
See application file for complete search history.

(56) References Cited

U.S. PATENT DOCUMENTS 4,629,043 A * 12/1986 Matsuo ................ B60T 13/746 477/92
6,325,471 B1 * 12/2001 Curran ................ B60T 13/741 303/155
(Continued)

FOREIGN PATENT DOCUMENTS

DE 10 2008 018 470 10/2009
JP 8-198100 8/1996
(Continued)

OTHER PUBLICATIONS

Office Action issued Apr. 15, 2024 in corresponding KR Patent Application No. 10-2022-7031326, with machine translation.
(Continued)

*Primary Examiner* — Bradley T King
(74) *Attorney, Agent, or Firm* — Wenderoth, Lind & Ponack, L.L.P.

(57) ABSTRACT

An electric parking brake device is associated with a service brake configured to generate a brake force in accordance with an operation input of a vehicle user, and configured to enable a parking brake configured to generate a brake force with a function of an electric actuator having operation controlled by a control unit. The control unit is configured to: (i) start to count in response to an end of detection of the
(Continued)

service brake by a service brake detector; and (ii) stop operation of the control unit itself after an elapse of a first predetermined time from the start of the count.

8 Claims, 6 Drawing Sheets

(51) Int. Cl.
*B60T 17/22* (2006.01)
*B60T 11/04* (2006.01)

(52) U.S. Cl.
CPC ....... *B60T 13/746* (2013.01); *B60T 2270/413* (2013.01)

(56) References Cited

U.S. PATENT DOCUMENTS

| | | | | |
|---|---|---|---|---|
| 6,959,794 | B2 * | 11/2005 | Ralea | B60T 7/085 188/196 R |
| 8,103,421 | B2 * | 1/2012 | Kondo | F16D 65/567 303/20 |
| 11,285,928 | B2 * | 3/2022 | Xu | B60T 13/74 |
| 2004/0238299 | A1 * | 12/2004 | Ralea | B60T 17/221 188/156 |
| 2007/0225890 | A1 * | 9/2007 | Ringlstetter | B60T 13/66 188/161 |
| 2008/0185235 | A1 * | 8/2008 | Suzuki | B60T 13/686 188/1.11 E |
| 2009/0204302 | A1 * | 8/2009 | Kondo | B60T 11/046 701/70 |
| 2009/0206658 | A1 | 8/2009 | Hilberer | |
| 2012/0138394 | A1 * | 6/2012 | Park | B60T 7/12 188/1.11 E |
| 2014/0306515 | A1 * | 10/2014 | Claussen | B60T 8/328 303/116.1 |
| 2017/0015293 | A1 | 1/2017 | Yagashira et al. | |
| 2018/0065602 | A1 * | 3/2018 | Chung | B60T 13/662 |
| 2020/0238962 | A1 * | 7/2020 | Stoehr | B60T 8/171 |
| 2021/0001830 | A1 | 1/2021 | Uraoka | |
| 2023/0039115 | A1 * | 2/2023 | Choi | B60T 13/74 |
| 2024/0217502 | A1 * | 7/2024 | Caspari | B60T 13/18 |

FOREIGN PATENT DOCUMENTS

| | | |
|---|---|---|
| JP | 2005-96543 | 4/2005 |
| JP | 2006-298094 | 11/2006 |
| JP | 2012-35773 | 2/2012 |
| JP | 5404041 | 1/2014 |
| JP | 2014-205391 | 10/2014 |
| JP | 2018-9617 | 1/2018 |
| JP | 2019-171888 | 10/2019 |
| KR | 10-2016-0134833 | 11/2016 |

OTHER PUBLICATIONS

International Search Report issued Feb. 9, 2021 in International Application No. PCT/JP2020/047373, with English-language translation.

Written Opinion of the International Searching Authority issued Feb. 9, 2021 in International Application No. PCT/JP2020/047373, with English language translation.

Office Action dated Jan. 22, 2026 in Indian Patent Application No. 202217051386.

* cited by examiner

ELECTRIC PARKING BRAKE DEVICE

TECHNICAL FIELD

The present invention relates to an electric parking brake device which enables a service brake that generates a brake force in accordance with an operation input of a vehicle user and a parking brake that generates a brake force with the function of an electric actuator having operation controlled by a control unit.

BACKGROUND ART

Such an electric parking brake device has been known from JP 2006-298094 A and JP 2014-205391 A. In the electric parking brake device disclosed in JP 2006-298094 A, when the rotation of a vehicle wheel is detected by a rotation sensor in a parked state of a vehicle, it is determined that the vehicle has started to move unintentionally, and the parking brake force is increased by operation of an electric actuator. In addition, in the electric parking brake device disclosed in JP 2014-205391 A, the start of movement of a vehicle is accurately determined without sensitively sensing the shaking of the vehicle in a parked state thereof, and thus, a needless increase in parking brake force in cases other than the start of the movement is avoided.

CITATION LIST

Patent Literature

PTL 1: JP 2006-298094 A
PTL 2: JP 2014-205391 A

SUMMARY OF INVENTION

Technical Problem

Incidentally, in the electric parking brake device disclosed in each of JP 2006-298094 A and JP 2014-205391 A, to perform increase control of a parking brake force after parking, it is required to keep a control unit to be activated even after the ignition of an engine is turned off. However, when the control unit is carelessly kept activated for a long period of time, there is a risk in that a battery may run out.

The present invention has been made in view of the above-mentioned circumstances, and has an object to provide an electric parking brake device capable of reducing the load on a battery by preventing a control unit from being kept activated for a period of time that is longer than necessary.

Solution to Problem

In order to achieve the object described above, the present invention has a first feature that there is provided an electric parking brake device which enables a service brake that generates a brake force in accordance with an operation input of a vehicle user and a parking brake that generates a brake force with the function of an electric actuator having operation controlled by a control unit, including service brake detection means connected to the control unit to detect whether or not the service brake has been applied after completion of application operation of the electric actuator, wherein the control unit starts to count in response to an end of detection of the service brake by the service brake detection means and stops operation of the control unit after an elapse of a first predetermined time from the start of the count.

Further, in addition to the configuration of the first feature, the present invention has a second feature that, the control unit resets the count in response to the detection of application of the service brake by the service brake detection means in the middle of time passage by the count and start recount, and stops the operation of the control unit after an elapse of a second predetermined time from the start of the recount.

In addition to the configuration of the second feature, the present invention has a third feature that, the first predetermined time and the second predetermined time are set to be the same.

In addition to any one of the configurations of the first to third features, the present invention has a fourth feature that, the service brake detection means is a hydraulic pressure sensor configured to detect a brake hydraulic pressure for obtaining a brake force by the service brake.

Further, in addition to any one of the configurations of the first to fourth features, the present invention has a fifth feature that, the electric actuator coupled to a brake cable to drive a parking brake lever is attached to a drum brake including a wheel cylinder configured to generate the brake force by the service brake, the parking brake lever configured to operate to obtain the brake force by the parking brake, and the brake cable coupled to the parking brake lever.

Advantageous Effects of Invention

According to the first feature of the present invention, the operation of the control unit is stopped when the first set time has elapsed after the end of the service brake. As a result, the load on a battery can be reduced by preventing the control unit from being kept activated for a period of time that is longer than necessary.

In addition, according to the second feature of the present invention, when the service brake has been applied in the middle by the time when the first set time elapses, the recount is started to stop the operation of the control unit after an elapse of the second predetermined time. As a result, when there is an additional operation input of the vehicle user after the end of the service brake, the increase control of the parking brake force can be performed.

According to the third feature of the present invention, the first predetermined time and the second predetermined time are the same. As a result, the increase control of the parking brake force can be reliably performed additionally.

According to the fourth feature of the present invention, the service brake detection means is a hydraulic pressure sensor configured to detect a brake hydraulic pressure. As a result, through the use of a hydraulic pressure sensor used in ordinary brake hydraulic pressure control, the use of a special sensor is made unnecessary to suppress an increase in the number of parts.

Further, according to the fifth feature of the present invention, the present invention can be suitably applied to the drum brake having the electric actuator attached thereto.

REFERENCE SIGNS LIST

17 wheel cylinder
34 parking brake lever
37 brake cable
38 electric actuator
66 hydraulic pressure sensor serving as service brake detection means
B drum brake
C control unit

DESCRIPTION OF EMBODIMENT

An embodiment of the present invention is described with reference to the accompanying FIG. 1 to FIG. 6.

First Embodiment

Figure 1:
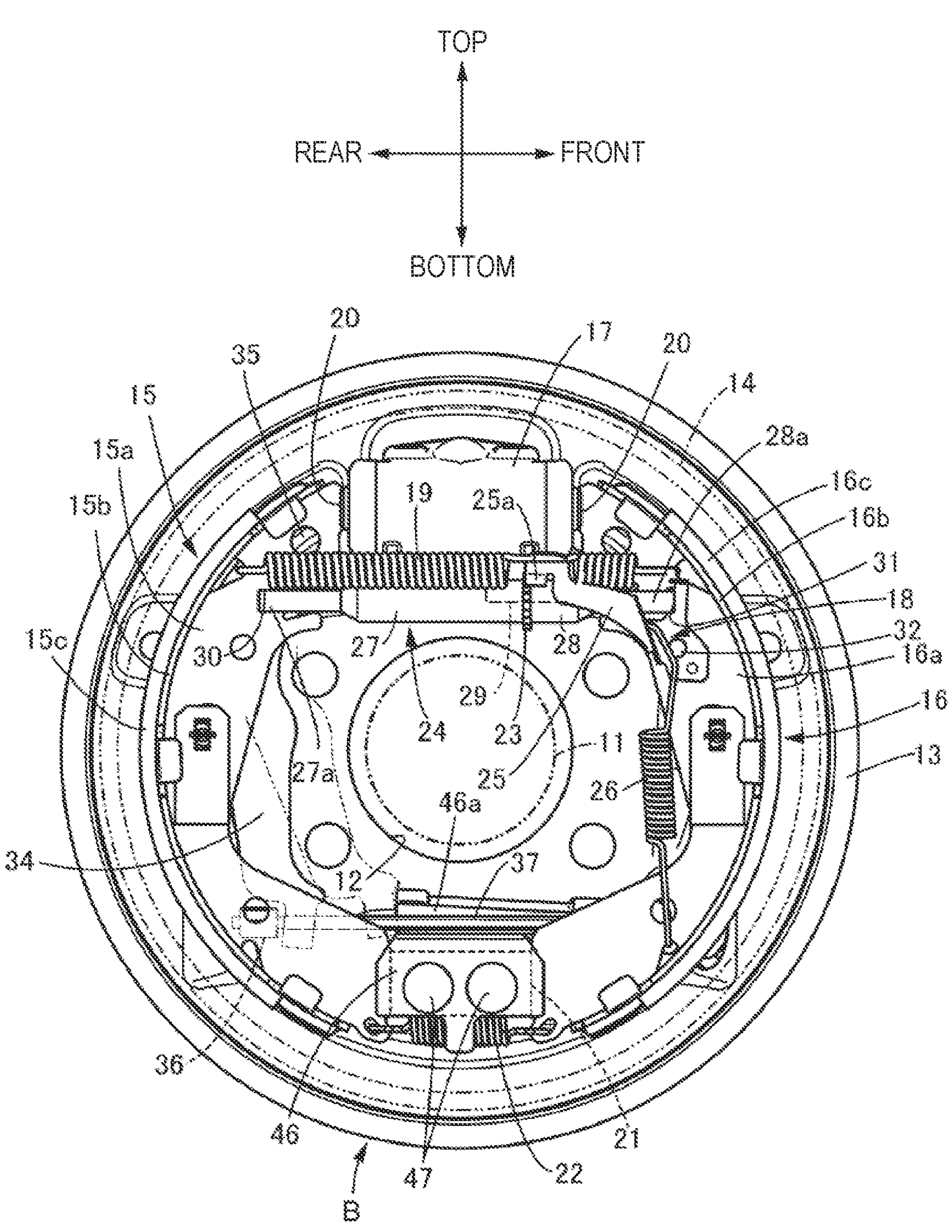
FIG. 1 is a front view of a drum brake (first embodiment).

First, in FIG. 1, a drum brake B is provided on a vehicle wheel of a four-wheeled vehicle, for example, a left rear wheel, and the drum brake B includes: a fixed back plate 13 having, in a center portion, a through hole 12 for allowing an axle 11 of the left rear wheel to pass therethrough; first and second brake shoes 15 and 16 arranged in the back plate 13 to be brought into slide contact with an inner periphery of a brake drum 14 that rotates together with the left rear wheel; a wheel cylinder 17 fixed to the back plate 13 to exert a force for causing the first and second brake shoes 15 and 16 to operate to expand; braking gap automatic adjustment means (so-called auto adjuster) 18 for automatically adjusting the gap between the first and second brake shoes 15 and 16 and the brake drum 14; and return springs 19 provided between the first and second brake shoes 15 and 16.

The first and second brake shoes 15 and 16 include: first and second webs 15*a* and 16*a* each formed in a bow-like flat plate shape along the inner periphery of the brake drum 14; first and second rims 15*b* and 16*b* formed continuously from the first and second webs 15*a* and 16*a* to be orthogonal to outer peripheries thereof, respectively; and first and second linings 15*c* and 16*c* bonded to outer peripheries of the first and second rims 15*b* and 16*b*, respectively.

An anchor plate 21 serving as a fulcrum at the time of expansion and contraction of the first and second brake shoes 15 and 16 is fixedly installed on the back plate 13 to rotatably support one end portion (lower end portion in this embodiment) of each of the first and second webs 15*a* and 16*a*. In addition, the wheel cylinder 17 is fixed to the back plate 13 between the other end portions of the first and second brake shoes 15 and 16 to operate with the output hydraulic pressure of a master cylinder (not shown) operated by a brake pedal to exert a force for driving the first and second brake shoes 15 and 16 to an expansion side through the use of the anchor plate 21 as a fulcrum, and outer end portions of a pair of pistons 20 provided in the wheel cylinder 17 are arranged to be opposed to the other end portions (upper end portions in this embodiment) of the first and second webs 15*a* and 16*a*.

A coil spring 22 that urges the one end portions of the first and second webs 15*a* and 16*a* to the anchor plate 21 side is provided between the one end portions of the first and second webs 15*a* and 16*a*, and a pair of return springs 19 that urge the first and second brake shoes 15 and 16 in a contraction direction are provided between the other end portions of the first and second webs 15*a* and 16*a*.

The braking gap automatic adjustment means 18 includes: a contraction position regulating strut 24 which is formed between the first and second webs 15*a* and 16*a* included in the first and second brake shoes 15 and 16 and which can be extended by rotation of an adjusting gear 23; an adjusting lever 25 which has a feed claw 25*a* that is engaged with the adjusting gear 23 and which is rotatably supported by the second web 16*a* of the second brake shoe 16 of the first and second brake shoes 15 and 16; and an adjusting spring 26 that urges the adjusting lever 25 to rotate to the side on which the adjusting gear 23 rotates in a direction of extending the contraction position regulating strut 24.

The contraction position regulating strut 24 regulates the contraction positions of the first and second brake shoes 15 and 16, and includes: a first rod 27 having a first engaging and coupling portion 27*a* that is engaged with a position closer to the other end portion of the first web 15*a* included in the first brake shoe 15 of the first and second brake shoes 15 and 16; a second rod 28 which has a second engaging and coupling portion 28*a* that is engaged with a position closer to the other end portion of the second web 16*a* included in the second brake shoe 16 and which is arranged coaxially with the first rod 27; and an adjusting bolt 29 having one end portion that is inserted into the first rod 27 to be relatively movable in an axis direction and having the other end portion that is threadedly engaged with the second rod 28 coaxially. The adjusting gear 23 is formed on an outer periphery of the adjusting bolt 29 to be arranged between the first and second rods 27 and 28.

A first locking recess 30 for engaging the first engaging and coupling portion 27*a* is formed on a side edge facing the axle 11 side closer to the other end portion of the first web 15*a*, and a second locking recess 31 for engaging the second engaging and coupling portion 28*a* is formed on a side edge facing the axle 11 side closer to the other end portion of the second web 16*a*.

The adjusting lever 25 having the feed claw 25*a* that is engaged with the adjusting gear 23 is rotatably supported by the second web 16*a* through the intermediation of a support shaft 32, and the adjusting spring 26 is provided between the second web 16*a* and the adjusting lever 25. Further, the spring force of the adjusting spring 26 is set to be smaller than the spring force of the return springs 19.

In the braking gap automatic adjustment means 18, at the time of causing the first and second brake shoes 15 and 16 to operate to expand through the operation of the wheel cylinder 17, when the first and second brake shoes 15 and 16 expand by a certain value or more due to the abrasion of the first and second linings 15*c* and 16*c*, the adjusting lever 25 rotates about the axis of the support shaft 32 due to the spring force of the adjusting spring 26. As a result, the effective length of the contraction position regulating strut 24 is corrected to be increased in accordance with the rotation of the adjusting gear 23.

Incidentally, the drum brake B includes a parking brake lever 34 capable of generating a parking brake force in accordance with the operation, and the parking brake lever 34 is arranged to overlap with a part of the first web 15*a* in the first brake shoe 15 in front view (direction illustrated in FIG. 1) in a direction along the rotation axis of the brake drum 14 and is extended long along a longitudinal direction of the first web 15*a*.

An engaging piece 36 fixed to one end portion of a brake cable 37 is engaged with one end portion (lower end portion in this embodiment) of the parking brake lever 34, and the other end portion (upper end portion in this embodiment) of the parking brake lever 34 is coupled to the other end portion of the first web 15*a* in the first brake shoe 15 through the intermediation of a pin 35.

When the parking brake of a vehicle operates, the parking brake lever 34 is driven to rotate in a counterclockwise direction of FIG. 1 through the use of the pin 35 as a fulcrum by the pulling force input from the brake cable 37. Due to the rotation of the parking brake lever 34, a force in a direction in which the second lining 16*c* included in the brake shoe 16 is brought into pressure contact with the inner periphery of the brake drum 14 acts on the second brake shoe 16 via the contraction position regulating strut 24. Further, when the parking brake lever 34 is continuously driven to rotate in the counterclockwise direction of FIG. 1, the parking brake lever 34 rotates through the use of the engagement portion with the first engaging and coupling portion 27*a* of the contraction position regulating strut 24 as a fulcrum. Then, the first brake shoe 15 operates to expand through the intermediation of the pin 35, and the first lining 15*c* of the first brake shoe 15 is brought into pressure contact with the inner periphery of the brake drum 14. That is, the parking brake lever 34 operates to an operation position at which the first and second linings 15*c* and 16*c* of the first and second brake shoes 15 and 16 are brought into pressure contact with the inner periphery of the brake drum 14, and under this state, a parking brake state is obtained.

In addition, when the application of the rotational drive force to the parking brake lever 34 is stopped by loosening the brake cable 37, the parking brake lever 34 returns to a non-operation position together with the first and second brake shoes 15 and 16 that operate due to the spring force of the return springs 19 in a direction of separating from the inner periphery of the brake drum 14, and the parking brake lever 34 is urged toward the non-operation position side.

Figure 2:
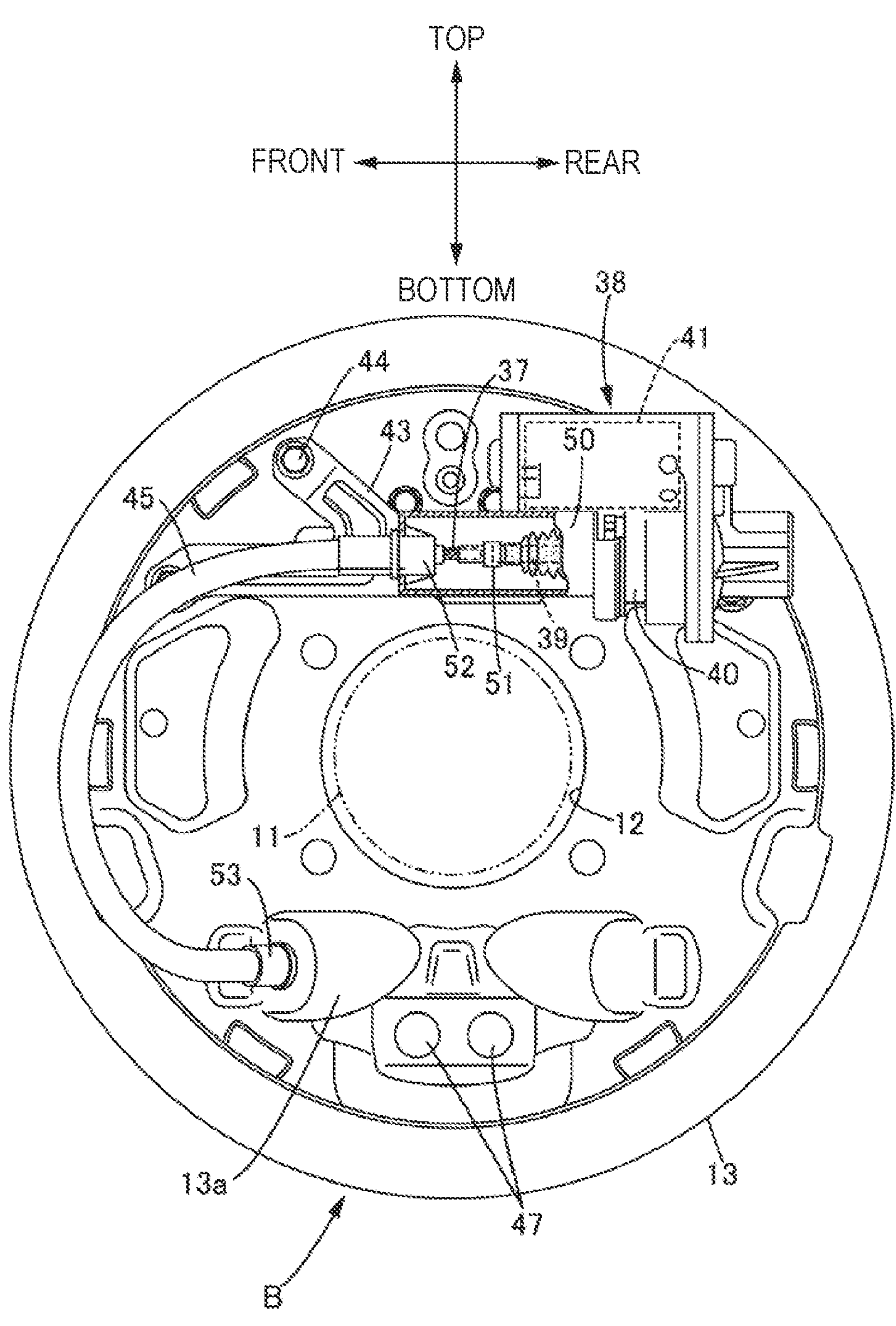
FIG. 2 is a rear view of the drum brake (first embodiment).

Also referring to FIG. 2, the brake cable 37 is pulled by the power exerted by an electric actuator 38, and the electric actuator 38 includes: a screw shaft 39 coupled to the brake cable 37; an actuator case 40 that supports the screw shaft 39 so that the screw shaft 39 can reciprocate in the axis direction while blocking the rotation thereof; an electric motor 41 accommodated in the actuator case 40 to freely rotate in forward and backward directions; and a motion conversion mechanism (not shown) that is accommodated in the actuator case 40 to be provided between the electric motor 41 and the screw shaft 39 while enabling the rotary motion generated in the electric motor 41 to be converted into the linear motion of the screw shaft 39.

The actuator case 40 of the electric actuator 38 is mounted to the back plate 13 on an opposite side of the wheel cylinder 17 through the intermediation of a mounting member 43. The mounting member 43 is fixed to the actuator case 40, and the mounting member 43 is fastened to the back plate 13 with a plurality of, for example, three bolts 44.

The screw shaft 39 of the electric actuator 38 is coupled to the brake cable 37 through the intermediation of a cable joint 51, and the coupling portion between the screw shaft 39 and the brake cable 37 is covered with a protective cylinder 50 connected to the actuator case 40.

A tubular portion 13*a* is integrally provided to project from a front portion along a vehicle front-and-rear direction of a lower portion of the back plate 13, and the brake cable 37 is introduced into the back plate 13 from the tubular portion 13*a*. In addition, the brake cable 37 is covered with an outer cable 45 formed by winding an iron wire in a coil shape between the protective cylinder 50 and the tubular portion 13*a*. An end portion of the outer cable 45 on the electric actuator 38 side is mounted to the protective cylinder 50 through the intermediation of a guide tube 52, and an end portion of the outer cable 45 on the back plate 13 side is mounted to the tubular portion 13*a* through the intermediation of a guide tube 53.

In addition, a holding plate 46 that sandwiches the anchor plate 21 with the back plate 13 is mounted to the lower portion of the back plate 13 with a pair of rivets 47 together with the anchor plate 21 between the one end portions of the first and second webs 15*a* and 16*a*, and a guide portion 46*a* that guides the brake cable 37 is integrally formed on the holding plate 46 to have a substantially U-shaped transverse sectional shape.

Figure 3:
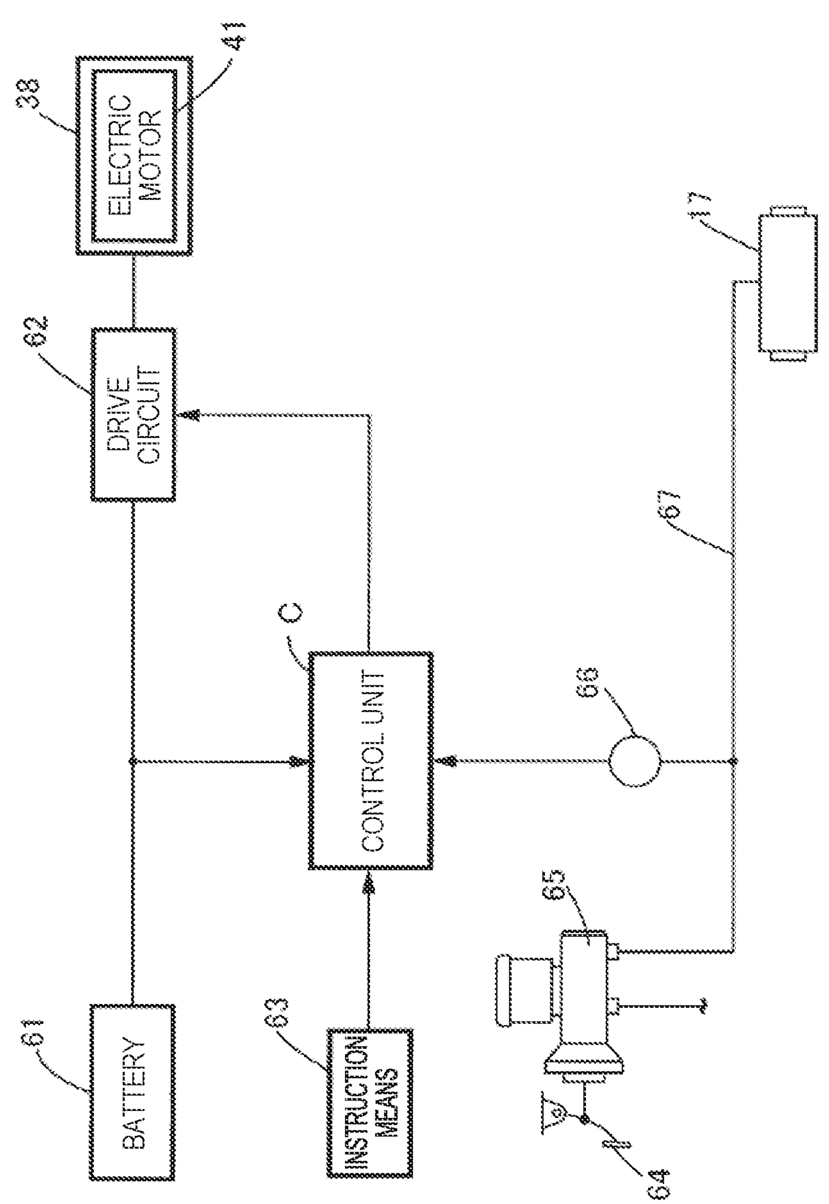
FIG. 3 is a block diagram for illustrating a configuration for controlling an electric actuator (first embodiment).

In FIG. 3, the electric power of a battery 61 is supplied to the electric motor 41 in the electric actuator 38 through a drive circuit 62, and the operation of the electric motor 41, that is, the operation of the drive circuit 62 is controlled by a control unit C. Instruction means 63 for detecting that a vehicle user has performed an operation for obtaining the parking brake state by operation of the electric actuator 38 and outputting a signal for instructing the electric actuator 38 on the start of the operation is connected to the control unit C.

In addition, the drum brake B generates a brake force when the wheel cylinder 17 operates in response to the operation input of the vehicle user at the time of the service brake. When the vehicle user steps on a brake pedal 64, the brake hydraulic pressure output from a master cylinder 65 acts on the wheel cylinder 17. A hydraulic pressure sensor 66 serving as a service brake detection means for detecting whether or not the service brake has been applied is inserted in a hydraulic pressure path 67 connecting the master cylinder 65 and the master cylinder 65 to detect the brake hydraulic pressure, and the brake hydraulic pressure detected by the hydraulic pressure sensor 66 is input to the control unit C.

Figure 4:
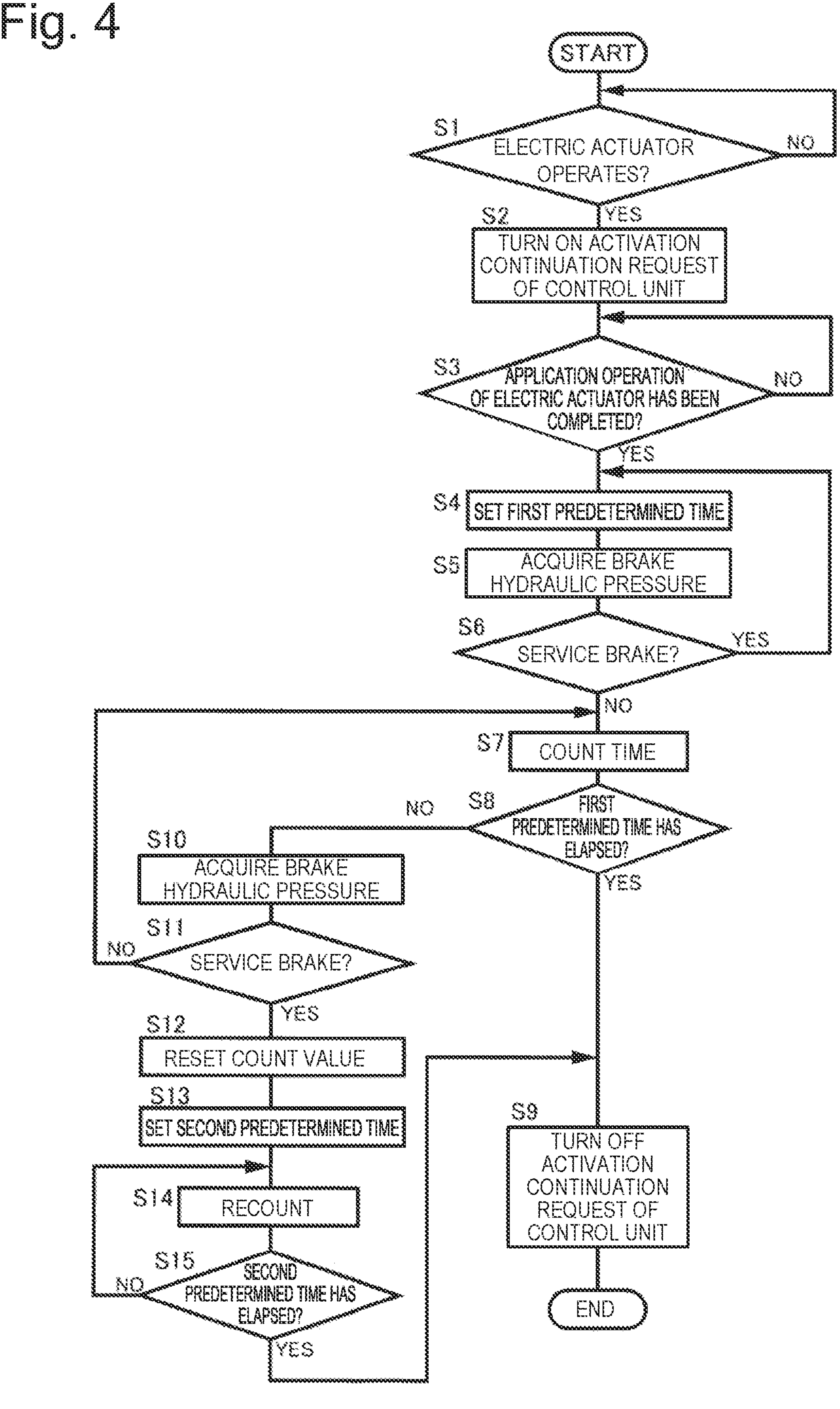
FIG. 4 is a flowchart for illustrating a control process at the time of the parking brake (first embodiment).

The control unit C performs the control in accordance with the process illustrated in FIG. 4 at the time of the parking brake. In Step S1, a determination is made on whether or not the electric actuator 38 is in an operation state. When it is determined that the electric actuator 38 is in the operation state, an activation continuation request of the control unit C is turned on in Step S2, and it is checked in Step S3 whether or not the application operation of the electric actuator 38 has been completed. When the completion of the application operation of the electric actuator 38 is confirmed, the flow proceeds to Step S4. In Step S4, a first predetermined time is set, and the brake hydraulic pressure detected by the hydraulic pressure sensor 66 is acquired in Step S5. After that, in Step S6, determination is made on, based on the brake hydraulic pressure, whether or not the vehicle is in a service brake state.

When it is determined that the vehicle is in the service brake state based on the determination in Step S6, the flow returns from Step S6 to Step S4. When it is determined that the vehicle is not in the service brake state, the flow proceeds from Step S6 to Step S7, and time is counted.

When it is determined, in Step S8 following the count in Step S7, that the first predetermined time has elapsed, the flow proceeds to Step S9, and the activation continuation request of the control unit C is turned off to stop the operation of the control unit C.

In addition, when it is determined in Step S8 that the first predetermined time has not elapsed, the flow proceeds from Step S8 to Step S10, and the brake hydraulic pressure detected by the hydraulic pressure sensor 66 is acquired. In Step S11 thereafter, a determination is made on, based on the brake hydraulic pressure, whether or not the vehicle is in the service brake state. When it is determined in Step S11 that the vehicle is not in the service brake state, the flow returns from Step S11 to Step S7. When it is determined that the vehicle is in the service brake state, the flow proceeds from Step S11 to Step S12, and the previous count value is reset.

In Step S13 following Step S12, a second predetermined time is set. The second predetermined time is the same as the first predetermined time in this embodiment. After the second predetermined time is set in Step S13, the flow proceeds to Step S14, and time is recounted to determine whether or not the second predetermined time has elapsed in Step S15. When the second predetermined time has not elapsed, the flow returns to Step S14. When it is confirmed that the second predetermined time has elapsed, the flow proceeds from Step S15 to Step S9.

Figure 5:
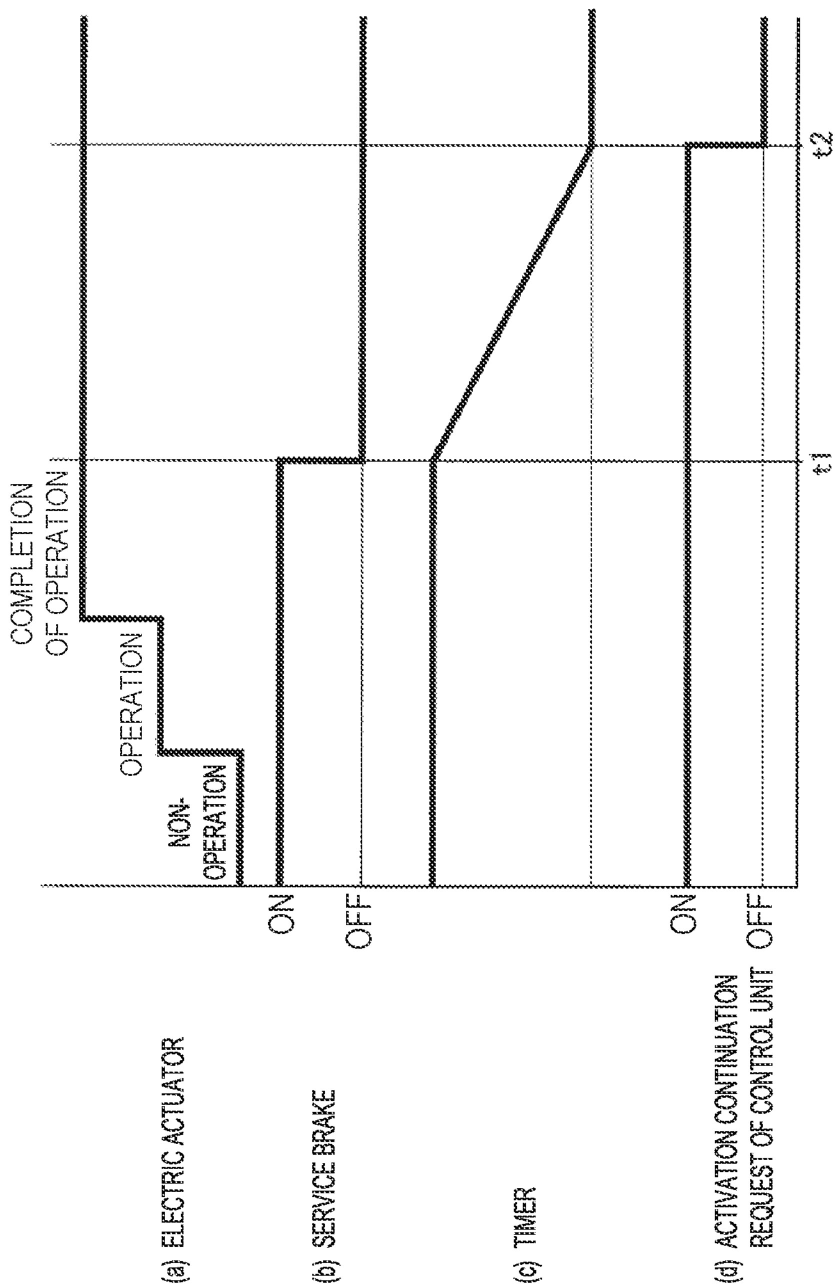
FIG. 5 is a timing chart for showing an example of an operation state of the electric actuator at the time of the parking brake, and changes in signals of a service brake, a timer, and an activation continuation request of a control unit (first embodiment).

According to a such control process, after the completion of the application operation of the electric actuator 38, the control unit C starts to count in response to the end of the detection of the service brake by the hydraulic pressure sensor 66 and stops the operation of the control unit C after an elapse of the first predetermined time from the start of the count. That is, as shown in FIG. 5, when the electric actuator 38 is changed from the non-operation state to the operation completion state through the operation state to obtain the parking brake state in the service brake state, the activation continuation request of the control unit C is in an ON state. When the service brake state is ended at a time t1, the timer starts the count. At a time t2 at which the first predetermined time has elapsed from the time t1, the activation continuation request of the control unit C is turned off, and the control unit C stops the operation thereof.

Figure 6:
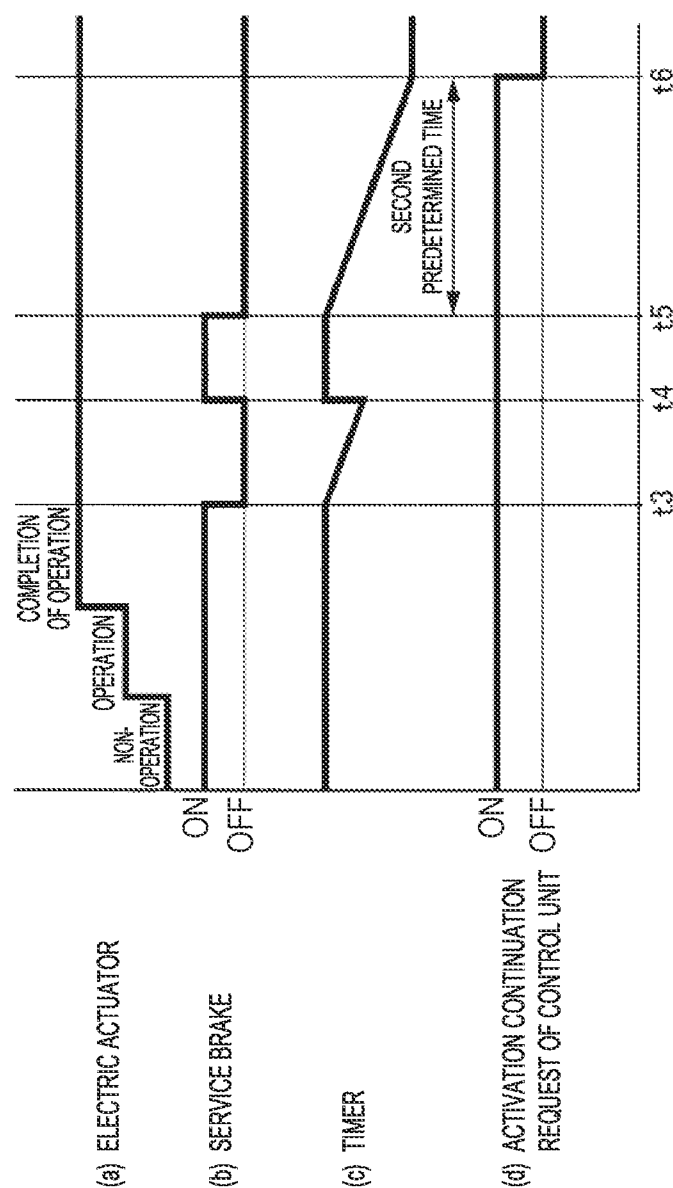
FIG. 6 is a timing chart for showing another example of an operation state of the electric actuator at the time of the parking brake, and changes in signals of the service brake, the timer, and the activation continuation request of the control unit (first embodiment).

In addition, the control unit C resets the count in response to the detection of application of the service brake by the hydraulic pressure sensor 66 in the middle of time passage by the count started in response to the end of the detection of the service brake and starts recount. After an elapse of the second predetermined time from the start of the recount, the control unit C stops the operation thereof. That is, as shown in FIG. 6, when the service brake state is ended at a time t3, the timer starts to count, and a count value is reset when the service brake state is obtained at a time t4 at which the time less than the first predetermined time has elapsed from the time t3. When the service brake state is ended at a time t5 thereafter, the recount by the timer is performed. At a time 16 at which the second predetermined time has elapsed, the activation continuation request of the control unit C is turned off, and the control unit C stops the operation thereof.

Next, the action of this embodiment is described. After the completion of the application operation of the electric actuator 38, the control unit C starts to count in response to the end of the detection of the service brake by the hydraulic pressure sensor 66 serving as the service brake detection means for detecting whether or not the service brake has been applied and stops the operation of the control unit C after an elapse of the first predetermined time from the start of the count. As a result, the load on the battery 61 can be reduced by preventing the control unit C from being kept activated for a period of time that is longer than necessary.

In addition, the control unit C resets the count in response to the detection of application of the service brake by the hydraulic pressure sensor 66 in the middle of time passage by the count and starts recount. After an elapse of the second predetermined time from the start of the recount, the control unit C stops the operation thereof. As a result, when there is an additional operation input of the vehicle user after the end of the service brake, the increase control of the parking brake force can be performed.

Further, the first predetermined time and the second predetermined time are set to be the same. As a result, the increase control of the parking brake force can be reliably performed additionally.

In addition, as the service brake detection means, the hydraulic pressure sensor 66 used in ordinary brake hydraulic pressure control is used. As a result, the use of a special sensor is made unnecessary to suppress an increase in the number of parts.

Further, the electric actuator 38 for obtaining the parking brake is attached to the drum brake B. As a result, the present invention can be suitably applied to the drum brake B having the electric actuator 38 attached thereto.

The embodiment of the present invention has been described. However, the present invention is not limited to the above-mentioned embodiment. Various changes in design can be made without departing from the scope of the gist of the present invention.

The invention claimed is:

1. An electric parking brake device which is associated with a service brake configured to generate a brake force in accordance with an operation input of a vehicle user, and which is configured to enable a parking brake configured to generate a brake force with a function of an electric actuator having operation controlled by a control unit, the electric parking brake device comprising:

a service brake detector connected to the control unit and configured to detect whether or not the service brake has been applied after completion of application operation of the electric actuator, wherein the control unit is configured to:

start to count in response to an end of detection of the service brake by the service brake detector;

stop operation of the control unit itself after an elapse of a first predetermined time from the start of the count;

reset the count in response to the detection of application of the service brake by the service brake detector in the middle of time passage by the count and start recount; and stop the operation of the control unit itself after an elapse of a second predetermined time from the start of the recount.

2. The electric parking brake device according to claim 1, wherein the first predetermined time and the second predetermined time are the same.

3. The electric parking brake device according to claim 1, wherein the service brake detector is a hydraulic pressure sensor configured to detect a brake hydraulic pressure for obtaining the brake force by the service brake.

4. The electric parking brake device according to claim 2, wherein the service brake detector is a hydraulic pressure sensor configured to detect a brake hydraulic pressure for obtaining the brake force by the service brake.

5. The electric parking brake device according to claim 1, wherein the electric actuator coupled to a brake cable to drive a parking brake lever is attached to a drum brake including a wheel cylinder configured to generate the brake force by the service brake, the parking brake lever being configured to operate to obtain the brake force by the parking brake, and the brake cable being coupled to the parking brake lever.

6. The electric parking brake device according to claim 2, wherein the electric actuator coupled to a brake cable to drive a parking brake lever is attached to a drum brake including a wheel cylinder configured to generate the brake force by the service brake, the parking brake lever being configured to operate to obtain the brake force by the parking brake, and the brake cable being coupled to the parking brake lever.

7. The electric parking brake device according to claim 3, wherein the electric actuator coupled to a brake cable to drive a parking brake lever is attached to a drum brake including a wheel cylinder configured to generate the brake force by the service brake, the parking brake lever being configured to operate to obtain the brake force by the parking brake, and the brake cable being coupled to the parking brake lever.

8. The electric parking brake device according to claim 4, wherein the electric actuator coupled to a brake cable to drive a parking brake lever is attached to a drum brake including a wheel cylinder configured to generate the brake force by the service brake, the parking brake lever being configured to operate to obtain the brake force by the parking brake, and the brake cable being coupled to the parking brake lever.

* * * * *